United States Patent
Cook et al.

(10) Patent No.: US 10,641,237 B2
(45) Date of Patent: May 5, 2020

(54) POWER GENERATION UNIT FOR OCEANOGRAPHIC SENSOR MOORINGS

(71) Applicant: Memorial University of Newfoundland, St. John's (CA)

(72) Inventors: Andrew Cook, Saint John's (CA); Adam Press, Saint John's (CA); Geoff Holden, Saint John's (CA)

(73) Assignee: Memorial University of Newfoundland, St. John's (CA)

( * ) Notice: Subject to any disclaimer, the term of this patent is extended or adjusted under 35 U.S.C. 154(b) by 87 days.

(21) Appl. No.: 15/766,224

(22) PCT Filed: Oct. 6, 2016

(86) PCT No.: PCT/CA2016/000250
§ 371 (c)(1),
(2) Date: Apr. 5, 2018

(87) PCT Pub. No.: WO2017/063070
PCT Pub. Date: Apr. 20, 2017

(65) Prior Publication Data
US 2018/0291867 A1    Oct. 11, 2018

(30) Foreign Application Priority Data
Oct. 16, 2015    (CA) ...................... 2908534

(51) Int. Cl.
*F03B 17/06* (2006.01)
*B63B 22/04* (2006.01)
(Continued)

(52) U.S. Cl.
CPC ............ *F03B 17/061* (2013.01); *B63B 22/04* (2013.01); *F03B 13/00* (2013.01); *F03B 13/10* (2013.01);
(Continued)

(58) Field of Classification Search
CPC ......... F03B 17/061; F03B 13/10; B63B 22/04
See application file for complete search history.

(56) References Cited

U.S. PATENT DOCUMENTS 3,628,205 A    12/1971  Starkey et al.
4,850,190 A *  7/1989  Pitts ........................ F03B 13/10
                                                           60/398
(Continued)

FOREIGN PATENT DOCUMENTS

CN    202624588 U    12/2012
GB      2480694 A    11/2011

OTHER PUBLICATIONS

Canadian Patent Office; Search Report in International Patent Application No. PCT/CA2016/000250 dated Dec. 8, 2016; 4 pages.
(Continued)

*Primary Examiner* — Sean Gugger
(74) *Attorney, Agent, or Firm* — Wood Herron & Evans LLP (57) ABSTRACT

An oceanographic sensor mooring section for use with standard oceanographic moorings comprising: mooring oceanographic equipment, such as floatation devices and sensors; and a subsurface power generation unit connected to the mooring oceanographic equipment, wherein the mooring section has connective swivels at opposing ends thereof for attachment of the mooring section to standard oceanographic moorings, mooring lines, or mooring anchors, to allow the mooring section to independently orient in the direction of current flow. The subsurface power generation unit comprises a battery and power management/tracking electronics and a rim turbine generating unit that harnesses the power of underwater currents to power any sensors and related electronics equipment.

3 Claims, 8 Drawing Sheets

(51) Int. Cl.
*F03B 13/00* (2006.01)
*F03B 13/10* (2006.01)
*B63B 35/44* (2006.01)

(52) U.S. Cl.
CPC . *B63B 2035/4466* (2013.01); *F05B 2220/706* (2013.01); *F05B 2220/7068* (2013.01); *F05B 2240/97* (2013.01); *Y02E 10/28* (2013.01); *Y02E 10/38* (2013.01)

(56) References Cited

U.S. PATENT DOCUMENTS

| | | | |
|---|---|---|---|
| 6,647,716 B2 | 11/2003 | Boyd | |
| 6,791,205 B2 | 9/2004 | Woodbridge | |
| 7,471,009 B2 | 12/2008 | Davis et al. | |
| 7,535,117 B2 | 5/2009 | Montgomery | |
| 2005/0285407 A1* | 12/2005 | Davis | F03B 3/128 290/54 |
| 2010/0314885 A1 | 12/2010 | Presz, Jr. et al. | |
| 2011/0109091 A1 | 5/2011 | Greyshock | |
| 2012/0212350 A1* | 8/2012 | Magnell | F03B 13/10 340/850 |
| 2013/0236314 A1* | 9/2013 | Feiler | F03B 11/02 416/177 |
| 2013/0334823 A1 | 12/2013 | Hopper | |
| 2014/0038479 A1* | 2/2014 | Johnstone | B63B 21/50 441/22 |
| 2014/0153360 A1* | 6/2014 | Tonchia | G01V 1/38 367/19 |
| 2015/0171694 A1* | 6/2015 | Walsh | H02K 3/47 310/156.43 |

OTHER PUBLICATIONS

European Patent Office; Supplementary European Search Report in related European Patent Application No. 16854668.7 dated Apr. 3, 2019; 10 pages.

\* cited by examiner

CURRENT FLOW

POWER GENERATION UNIT FOR OCEANOGRAPHIC SENSOR MOORINGS

FIELD OF THE INVENTION

This invention relates to oceanographic moorings. In particular, the present invention relates to power generation units that can supply power to oceanographic sensor moorings, and more particularly to power generation units that can supply power from ocean currents to standard oceanographic sensor moorings.

BACKGROUND OF THE INVENTION

A mooring in oceanography is a collection of devices, connected to a wire and anchored on the seabed/sea floor, lake bed, river bed, or bed of other waterway. Typically, the mooring is held up in the water column by a variety of subsurface or surface floatation devices (steel floats, glass floats, plastic floats, etc.), and held in place on the waterway bed with a heavy anchor. Devices attached to the mooring often comprise sensors of various types that are designed to measure various conditions or things found in the ocean. For example, the sensors could include devices such as current meters, conductivity/temperature/depth sensors, and other biological sensors.

Unfortunately, because of the impracticability of directly connecting these sensors to typical power generation plants, these sensors are very often powered via one or more batteries or battery packs, all of which have a limited lifespan once deployed. There is thus a significant cost to maintaining oceanographic moorings. For one, these batteries require periodic changing, some on relatively short intervals, such as every six or twelve months. To replace the batteries, a crew and vessel are required to travel to the mooring to replace the battery or battery pack. Vessel and crew costs can be extremely high. To minimize this cost and to achieve deployments of longer duration, electricity use may be minimized in order to try to prolong the lifespan of the battery or battery pack. One way of accomplishing this is to reduce the sampling rate of the sensors so as to lower their average power consumption and thereby reduce the amount of power drawn from the battery or battery pack. Naturally, this results in the sensors capturing less data over a given time period, which is not ideal for research or the like. If, however, real time data is desired or a necessity, because acoustic or inductive telemetry systems that allow for the capture and transmission of real time data require a lot of power, this drains the battery or battery pack quickly, thereby increasing maintenance costs for such applications.

There are a variety of known methods of providing power to traditional moorings, including two methods that are surface mounted. The first is solar based, drawing power from the sun through panels located at the water surface. The second is a wave power harvesting system, which generates power from ocean waves, again at the surface of the water. The latter type of systems are disclosed in, for example, U.S. Pat. No. 6,791,205 B2 (Woodbridge), U.S. Pat. No. 6,647,716 B2 (Boyd), and U.S. Pat. No. 7,535,117 B2 (Montgomery). The power in both the solar and wave powered cases is transmitted from the water's surface where it was generated down to instruments in the mooring through a power cable. However, because this distance can be considerable in a deep water mooring, a lengthy cable must be used at significant cost.

It is also known to convert the mechanical energy from subsurface ocean currents into electrical energy, and a great deal of effort has been expended commercially to develop large scale tidal turbine systems, including those for grid-tied applications. For example, U.S. Pat. No. 4,026,587 (Hultman and Hultman) discloses an underwater turbine to be mounted on a seabed by way of a large concrete base, upon which is rotatably mounted a large electric generator. However, such a system is not suitable for mounting on moorings to provide power to sensor systems. Indeed, there are few existing small-scale power generation systems for oceanographic applications, even though there is an ever increasing number of reasons for taking ocean measurements, and a greater need for small-scale power generation systems that can support sensor arrays to take these measurements. Historically, for example, most of the measurement programs being conducted in the ocean have been sponsored by governments and operated and managed by scientists and engineers from international ocean research institutions and scientific agencies. There have also been a number of specialized ocean measurement programs that have been sponsored and carried out by the navies of the world for defense-related purposes. Today, however, there are a substantial and ever increasing number of commercial organizations that are starting to appreciate the need to collect and analyze information, including real-time information, about the physical, chemical, and biological processes that are occurring in various undersea locations around the world. Whether it be for the advancement of pure science, for health and human safety reasons, for military protection purposes, or for commercial exploitation, ocean observation and measurement is an emerging and growing market.

It would be desirable to employ a small-scale subsurface power generation system that can augment traditional oceanographic mooring designs by harvesting power from ocean currents and providing it to sensors in the mooring itself, with the potential benefits of allowing the sensors to operate and be powered for longer periods of time (i.e. increased deployment duration), whether in shallow or deep water, while maintaining or increasing the amount of data that may be captured as a result thereof (including the option of real-time data collection), as well as reducing maintenance costs.

It would further be desirable to use such a subsurface power generation system with traditional oceanographic moorings and their associated sensors in order to extend the lifespan and/or increase the usability of these moorings and sensors by allowing them to be recycled or re-used, thereby avoiding or minimizing replacement and upgrade costs.

SUMMARY OF THE INVENTION

The present invention provides a subsurface apparatus for supplying power to sensors/systems mounted on traditional oceanographic moorings that allows those sensors/systems to operate unattended for relatively long periods of time in shallow or deep water environments. In particular, the present invention provides a subsurface mooring power generation unit that can be used to augment existing mooring designs, harvest power from ocean currents and provide the power to sensors/instruments in the mooring. The power generation unit is generally comprised of: a rim turbine generating unit, and batteries and power management/tracking electronics, each of which is attached to a stainless steel frame, and swivels at opposing ends of the unit for attachment to typical mooring equipment to allow the entire unit to orient itself into the ocean current flow to maintain power supply.

More particularly, in one embodiment, the present invention provides an oceanographic sensor mooring section for use with standard oceanographic moorings comprising: mooring oceanographic equipment; and a subsurface power generation unit connected to said mooring oceanographic equipment, wherein said mooring section has connective swivels at opposing ends thereof for attachment of said mooring section to standard oceanographic moorings, mooring lines, or mooring anchors, to allow said mooring section to independently orient in the direction of current flow. The mooring oceanographic equipment may comprise a floatation device, and may further comprise a sensor for measuring one or more of physical, chemical or biological processes in an undersea environment. The subsurface power generation unit harnesses power from underwater currents. The subsurface power generation unit generally comprises a battery and power management/tracking electronics, and a rim turbine generating unit, each connected to a frame. The battery and power management/tracking electronics may comprise a lithium battery pack and associated electronics housed in a pressure housing. The rim turbine generating unit comprises a blade and rotor assembly rotatably connected to and within a venturi cowling and stator assembly by means of a shaft connected to said stator assembly that passes through the centre of said blade and rotor assembly. The blade and rotor assembly comprises at least three turbine blades the distal ends of which are attached to a cylindrical rotor thereof comprising magnets arranged in a Halbach array configuration, wherein said blade and rotor assembly is capable of rotating on the shaft that passes through the centre of said blade and rotor assembly on bearings. The rim turbine generating unit may further comprise a venturi cowling cap releasably connected to the venturi cowling and stator assembly and a nose cone releasably connected to a free end of the shaft of the venturi cowling and stator assembly. The venturi cowling and stator assembly comprises coils, a venturi cowling mount and at least 3 venturi cowling support rods. The coils may comprise at least 36 coils, each of said coils comprising 55 turns of 18 awg magnet wire and configured for 3 phase power output. The venturi cowling cap increases flow speed near the tips of the turbine blades and provides drag to orient the rim turbine generating unit in the direction of current flow. The rim turbine generating unit may also be associated with an alignment fin that assists in keeping said unit aligned in the direction of current flow. In addition, the rim turbine generating unit and alignment fin may pivot about a pivot point to allow the rim turbine generating unit to be self-compensating for mooring inclination.

In another embodiment, the present invention provides a subsurface power generation unit that harnesses power from underwater currents for use with standard oceanographic moorings comprising: a battery and power management/tracking electronics; and a rim turbine generating unit, wherein each of said battery and power management/tracking electronics and rim turbine generating unit is connected to a perpendicular frame, and wherein said frame has connective swivels at opposing ends thereof for attachment of said subsurface power generation unit to mooring oceanographic equipment, standard oceanographic moorings, mooring lines, or mooring anchors, to allow said subsurface power generation unit to independently orient in the direction of current flow. The battery and power management/tracking electronics may comprise a lithium battery pack and associated electronics housed in a pressure housing. The rim turbine generating unit comprises a blade and rotor assembly connected to a venturi cowling and stator assembly by means of a shaft connected to said venturi cowling and stator assembly that passes through the centre of said blade and rotor assembly. The blade and rotor assembly comprises at least three turbine blades the distal ends of which are attached to a cylindrical rotor thereof comprising magnets arranged in a Halbach array configuration, wherein said blade and rotor assembly rotates on the shaft that passes through the centre of said blade and rotor assembly on bearings. The rim turbine generating unit may further comprise a venturi cowling cap releasably connected to the venturi cowling and stator assembly and a nose cone releasably connected to a free end of the shaft of the venturi cowling and stator assembly. The venturi cowling and stator assembly comprises coils, a venturi cowling mount and at least 3 venturi cowling support rods. The coils comprise at least 36 coils, each of said coils comprising 55 turns of 18 awg magnet wire and configured for 3 phase power output. The venturi cowling cap increases flow speed near the tips of the turbine blades and provides drag to orient the rim turbine generating unit in the direction of current flow. The rim turbine generating unit may also be associated with an alignment fin that assists in keeping said generating unit aligned in the direction of current flow. The rim turbine generating unit and alignment fin may pivot about a pivot point to allow the rim turbine generating unit to be self-compensating for mooring inclination.

In yet another embodiment, the present invention provides an underwater rim turbine generating unit for use with standard oceanographic moorings that is capable of harnessing power from underwater currents comprising a blade and rotor assembly connected to a venturi cowling and stator assembly by means of a shaft connected to said venturi cowling and stator assembly and that passes through the centre of said blade and rotor assembly. The blade and rotor assembly comprises at least three turbine blades the distal ends of which are attached to a cylindrical rotor thereof comprising magnets arranged in a Halbach array configuration, wherein said blade and rotor assembly rotates on the shaft that passes through the centre of said blade and rotor assembly on bearings. The rim turbine generating unit may further comprise a venturi cowling cap releasably connected to the venturi cowling and stator assembly and a nose cone releasably connected to a free end of the shaft of the venturi cowling and stator assembly. The venturi cowling and stator assembly comprises coils, a venturi cowling mount, and at least 3 venturi cowling support rods. The coils comprise at least 36 coils, each of said coils comprising 55 turns of 18 awg magnet wire and configured for 3 phase power output. The venturi cowling cap increases flow speed near the tips of the turbine blades and provides drag to orient the rim turbine generating unit in the direction of current flow.

BRIEF DESCRIPTION OF THE DRAWINGS

In the detailed description which follows, reference will be made to the following drawings which illustrate embodiments of the present invention and, together with the description, serve to explain the principles and advantages of the present invention.

DETAILED DESCRIPTION OF THE INVENTION

Various non-limiting embodiments of the invention will now be described. Variants of these embodiments will be apparent to those skilled in the art.

Figure 1:
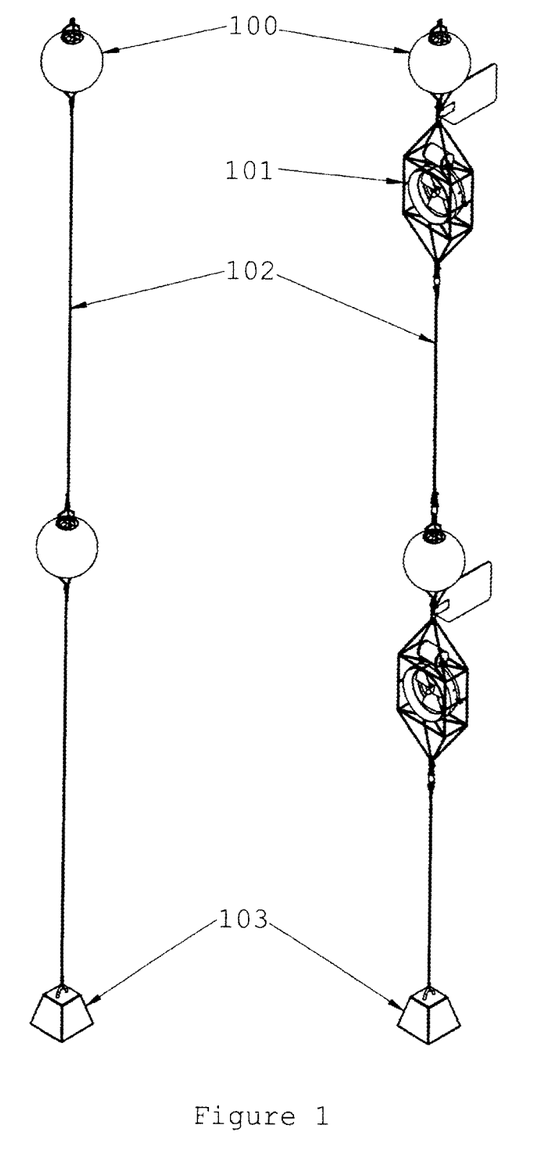
FIG. 1 is a profile view showing a typical oceanographic mooring on the left alongside one augmented with an embodiment of a power generation unit of the present invention.

With reference to FIG. 1, on the left side of this Figure is shown a traditional oceanographic mooring, comprising typical mooring oceanographic equipment 100 (in this example, generally floatation devices), each connected by wire/line 102, and attached to an anchor means 103 to anchor the mooring to a specific location above the seabed. Of course, anchor means 103 may be any means of anchoring the mooring oceanographic equipment 100 in a manner sufficient to hold such in place above a specific location on the seabed, in both reversible or irreversible manner, including typical anchors of all types. Sensors may be attached to any point of this oceanographic mooring, including, for example above, below or within the mooring oceanographic equipment 100, so that the sensor is correctly positioned to take measurements at the depth required. The term "wire/line 102" is used as a descriptive term only, this element being the link(s) that conjoin the various mooring oceanographic equipment 100 in the mooring as well as to the anchor means 103. It will be understood that while normally a wire is used in wire/line 102, and preferably a wire composed of metal and preferably a metal that does not rust on contact with water or salt water, the term wire/line can also comprise fabric materials such as ropes or cords, or even a multiplicity of solid rods, as the case and conditions warrant.

On the right side of FIG. 1 is shown an embodiment of the present invention, including mooring oceanographic equipment 100 (again, in this example, generally including floatation devices), anchor means 103, wire/line 102, but also augmented with power generation units 101 of the present invention. In the case of the embodiment shown in FIG. 1, two power generation units 101 are depicted attached below two of the mooring oceanographic equipment 100. It should be understood that more or fewer links in the oceanographic mooring can be added/removed to increase or decrease its length, as required. Also, it should be understood that more or fewer power generation units 101 can be added to the mooring, even conjoined together, both above or below the mooring oceanographic equipment 100, as desired.

Figure 2A:
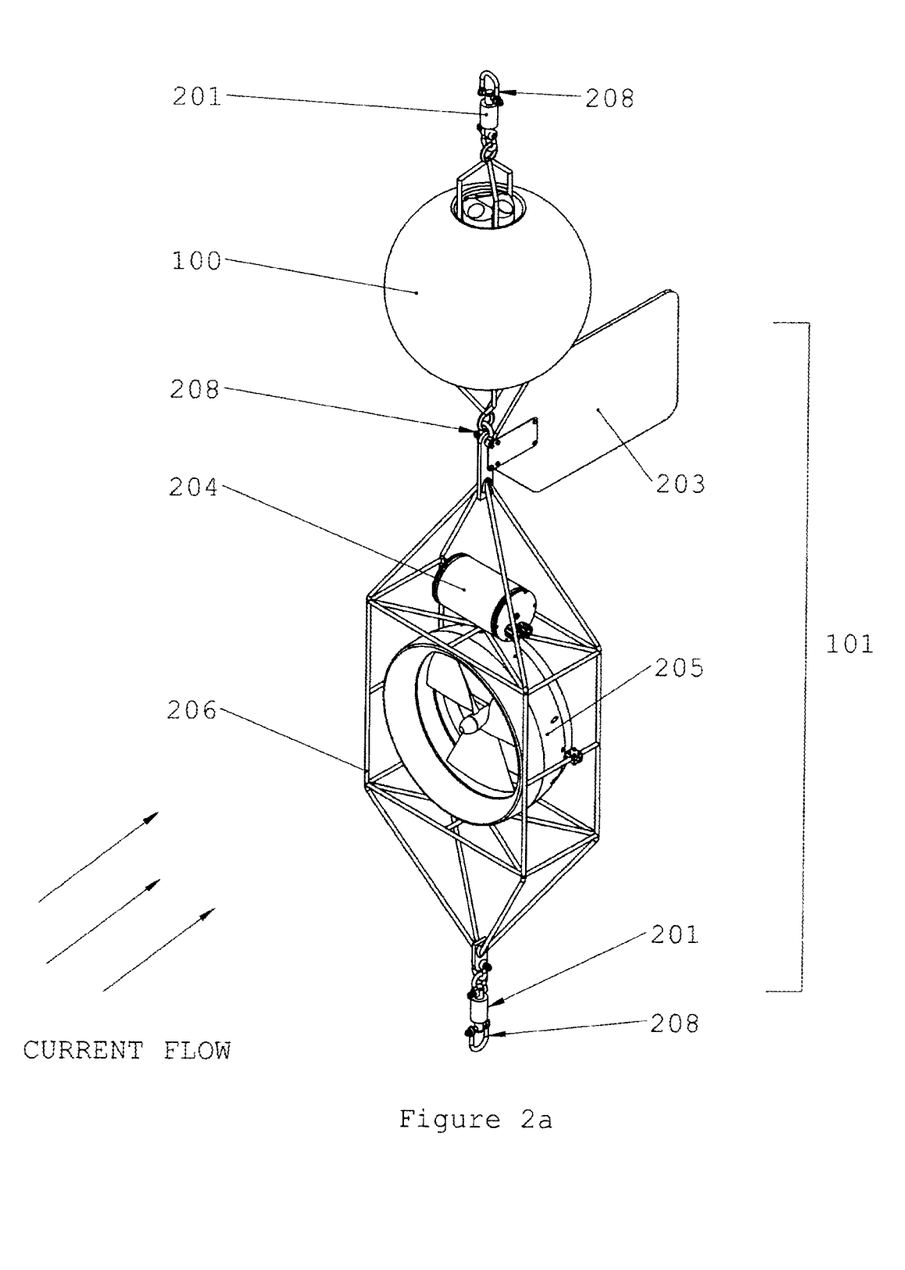
FIG. 2a is a perspective view of a power generation unit attached to typical mooring oceanographic equipment in accordance with one embodiment of the present invention.
Figure 2B:
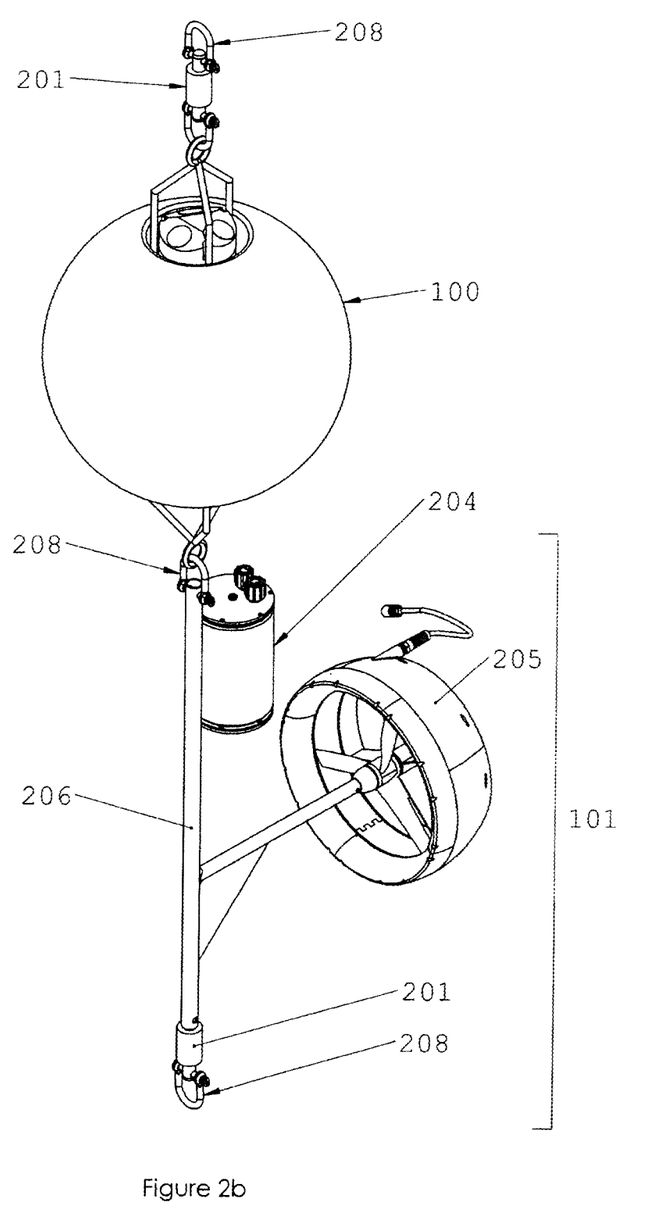
FIG. 2b is a perspective view of a power generation unit attached to typical mooring oceanographic equipment in accordance with a second embodiment of the present invention.

FIG. 2a shows an enlarged perspective view of one of the mooring oceanographic equipment 100 mounted above power generation unit 101, as shown in FIG. 1. In the embodiment shown in FIG. 2a, power generation unit 101 comprises at least one rim turbine generating unit 205, and battery and power management/tracking electronics 204, each of which is mounted to a frame 206. Specifically, in this embodiment, rim turbine generating unit 205 is mounted to and within frame 206, such that frame 206 protects and surrounds the rim turbine generating unit 205 without blocking water flow through it. More specifically, frame 206 is shown in FIG. 2a as a cage generally surrounding the rim turbine generating unit 205 and battery and power management/tracking electronics 204. However, the exact shape of frame 206 is not important to the function of the invention as shown in this embodiment provided it does not significantly block or negatively affect water flow to the rim turbine generating unit 205. Frame 206 can therefore be made in almost any shape and therefore may depend on the level of protection desired. In this respect, in another embodiment where protection of rim turbine generating unit 205 and battery and power management/tracking electronics 204 is of lesser concern, frame 206 may simply comprise a long vertical rod on which is mounted battery and power management/tracking electronics 204, and from which may extend perpendicularly thereto a secondary horizontal rod on which the rim turbine generating unit 205 may be mounted, as shown in FIG. 2b. In such an embodiment, the rim turbine generating unit 205 is capable of orienting itself downstream of the water current flow by action of water drag. Such an embodiment thereby allows the power generation unit 101 to maximize power generating capacity. Frame 206 can be made of any material that can support and optionally protect the rim turbine generating unit 205 and battery and power management/tracking electronics 204, and is preferably comprised of lightweight, strong, and corrosion resistant material such as stainless steel or aluminum. In this respect, frame 206 is more preferably made from stainless steel, but can be any material suitable for long term underwater use, and having the necessary strength to reliably hold the components of the present invention.

Power generation unit 101 (and mooring oceanographic equipment 100) are generally optionally but preferably rotatably connected to another power generation unit 101, wire/line 102, mooring oceanographic equipment 102, or the like, as shown in FIG. 2a, via a connector 208, which in FIG. 2a is shown as two interlocking rings, but can be any attachment means thought suitable including rigid connecting means. Power generation unit 101 (and mooring oceanographic equipment 102) can also be attached to those devices/parts and the like noted above by a swivel 201 (also shown in FIG. 2a), which more readily allows the power generation unit 101 or mooring oceanographic equipment 100, or the like, to freely rotate in the water current. Allowing the power generation unit 101 to independently and naturally orient itself allows for maximal power generation by allowing the unit to orient into water flow, while also minimizing torsional and rotational strain and stress on the mooring oceanographic equipment 100 and power generation unit 101.

Figure 2C:
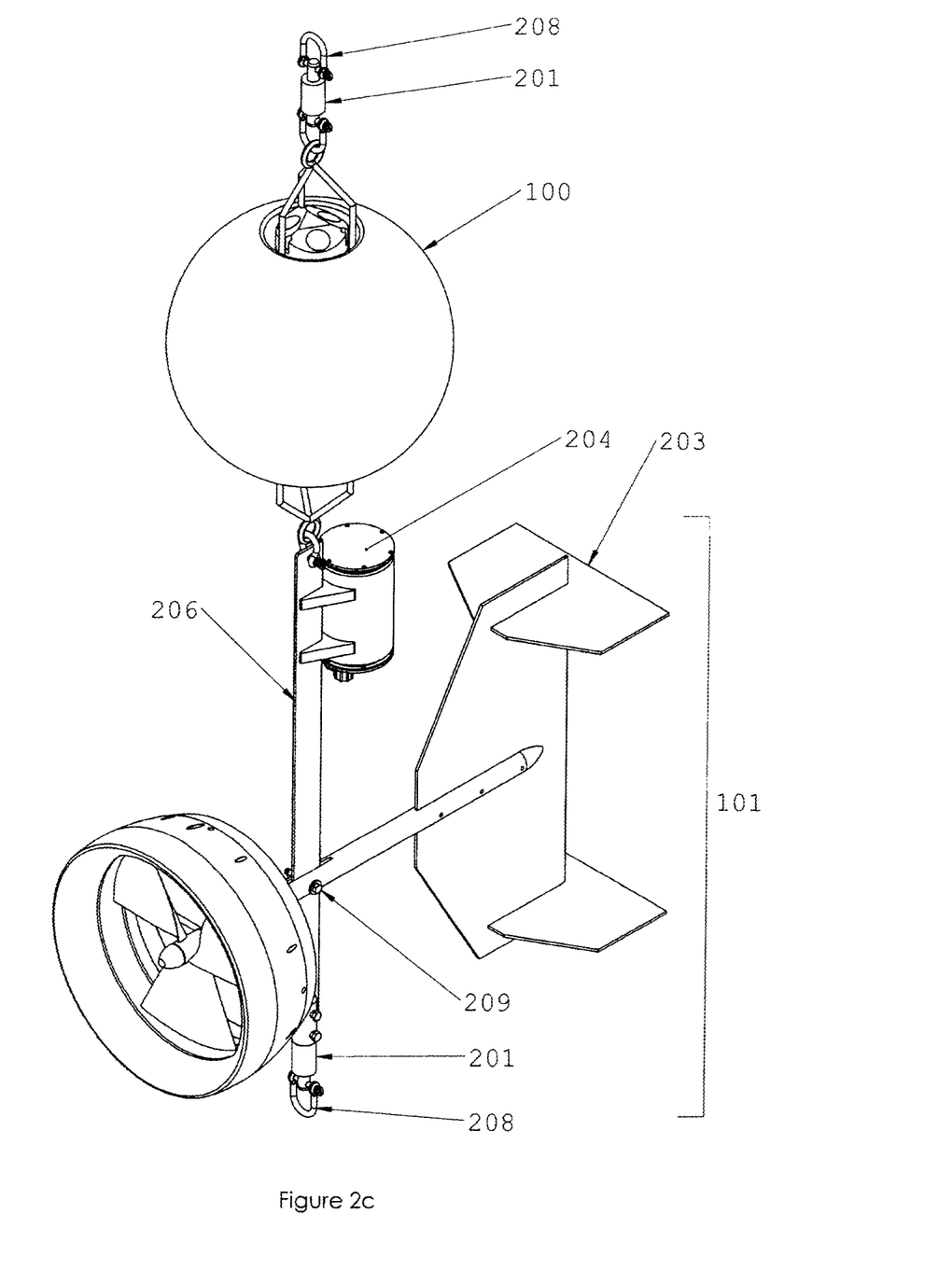
FIG. 2c is a perspective view of a power generation unit attached to typical mooring oceanographic equipment in accordance with a third embodiment of the present invention.

As shown in FIG. 2a, power generation unit 101 may also have an optional alignment fin 203 associated therewith, which serves to assist in keeping the power generation unit 101 aligned into current flow for more efficient power generation. Alignment fin 203 is preferably coupled with frame 206 such that any movement of fin 203 will also move the frame 206 as desired. Thus, if the rim turbine generating unit 205 is placed within frame 206 with its axis perpendicular to the axis of alignment of fin 203, as shown in FIG. 2a, this will assist to maximize generating capacity out of rim turbine generating unit 205. In particular, the subsurface water current will push on alignment fin 203, thereby orienting the frame 206 and coupled rim turbine generating unit 205 so that it is perpendicular to the current flow direction. The current then drives rim turbine generating unit 205, generating power that is fed to batteries and power management/tracking electronics 204, which in turn feeds the electricity to any sensors (not shown) that may be mounted on frame 206, or above, below or within mooring oceanographic equipment 100. Another embodiment of a power generation unit 101 with a fin 203 that is winged, and with a pivot point 209 is shown in FIG. 2c. This embodiment is similar to that shown in FIG. 2a in terms of operation, but the pivot point 209 further enables the rim turbine generating unit 205 to be self-compensating for mooring inclination as well as flow direction because the moments due to gravity and buoyancy acting on either side of the pivot point 209 are equal.

Batteries and power management/tracking electronics 204 can comprise any battery pack system suitable for accepting power from the rim turbine generating unit 205 and supplying it to the sensors desired to be used in connection with the oceanographic mooring system of the present invention. In one preferred embodiment, the batteries and power management/tracking electronics 204 can, for instance, comprise a 12.8V to 25.6V lithium battery pack and associated electronics housed in a pressure housing. The batteries may be recharged by a power tracking unit (not shown) and the battery power is then fed through a subsea connector to the sensor(s) attached to the oceanographic mooring (not shown). Such tracking unit is preferably capable of rectifying the three-phase AC to get a large DC voltage (which is usable from 14 to 500V). This voltage is then stepped down preferably using a buck converter to a voltage close to the battery voltage. The tracking unit measures the power that is going into the battery pack, and constantly adjusts the voltage to maintain the maximum amount of power. The batteries and power management/tracking electronics 204 should have safeguards in place to shut down the buck converter when the battery is fully charged to prevent overcharging and to not decrease the lifespan of the battery. As well, the batteries and power management/tracking electronics 204 should be capable of balancing the individual battery cells. This improves battery pack performance and lifespan. The foregoing would be well known to persons skilled in the art and further details are therefore unnecessary in this regard.

Figure 3:
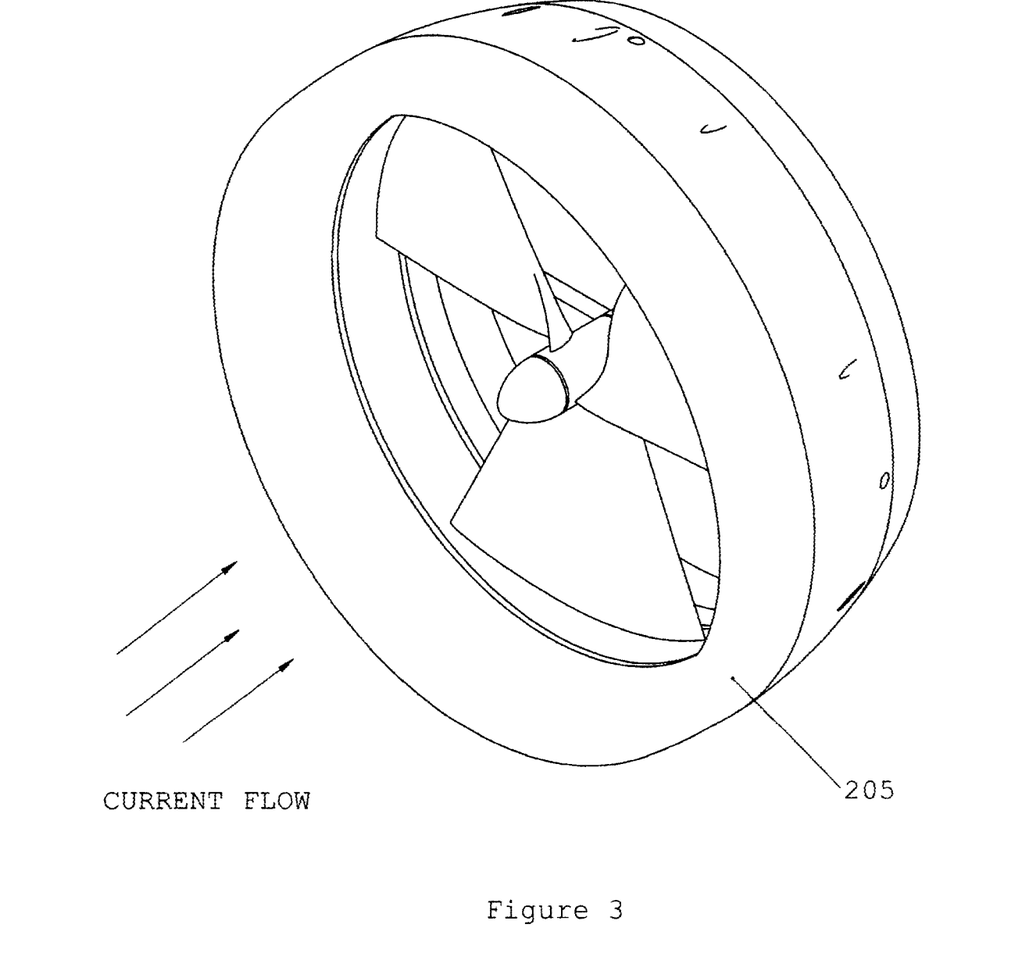
FIG. 3 is a perspective view showing an embodiment of the rim turbine generating unit of the present invention, as fully assembled and with indication of water current flow.
Figure 4:
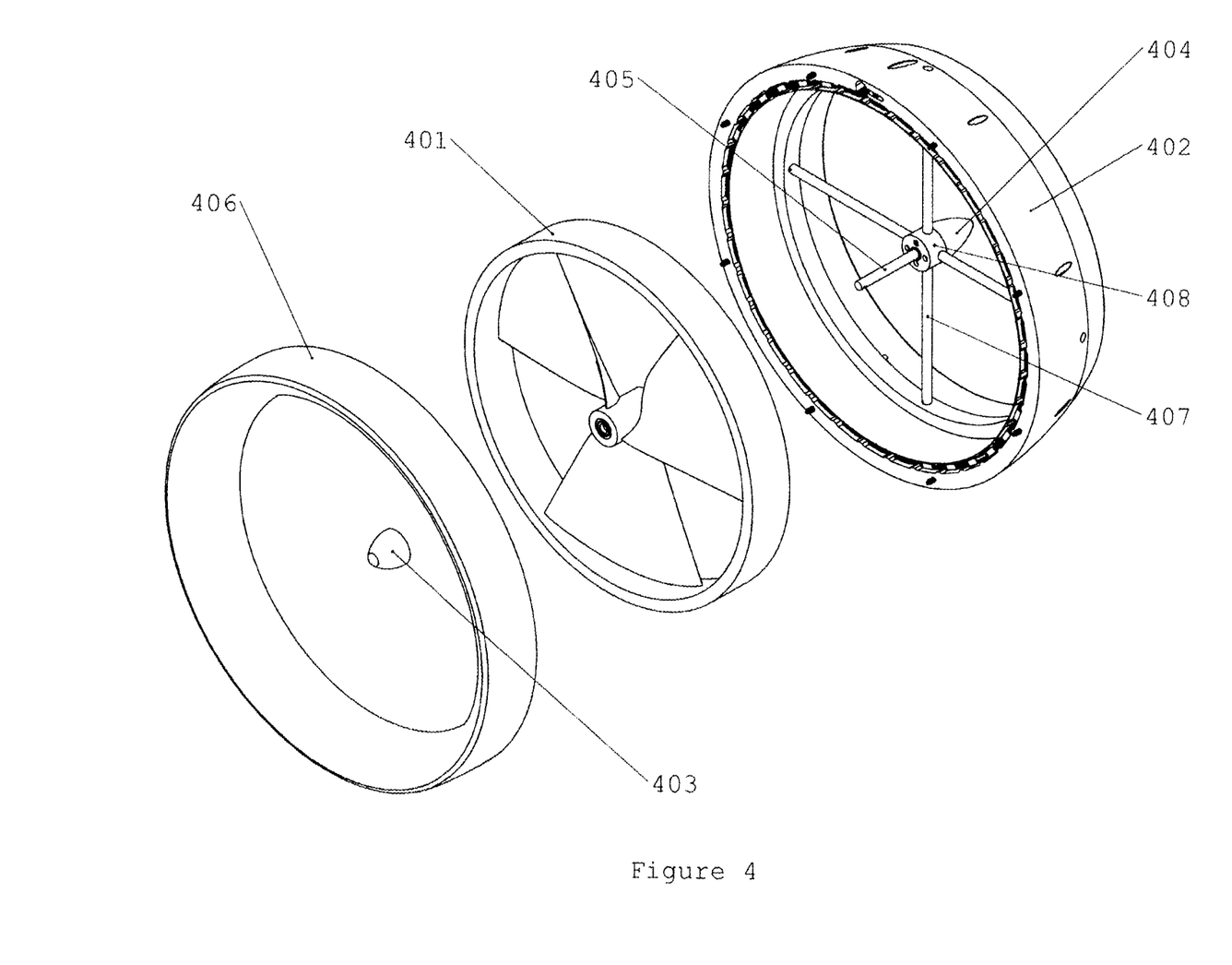
FIG. 4 is an exploded perspective view of the general components of a rim turbine generating unit, in accordance with one embodiment of the present invention.

Rim turbine generating unit 205 contains no gearbox, and has few rotating mechanical components when compared to those turbines and generators known in the art, which improves low speed flow startup. A preferred embodiment of rim turbine generating unit 205 in fully assembled form is shown in FIG. 3 with an indication of water current flow. FIG. 4 shows an exploded perspective view of a preferred embodiment of those parts/components that make up the rim turbine generating unit 205 of the present invention (i.e. in disassembled form), thereby allowing a person skilled in the art to readily understand how to make said rim turbine generating unit 205.

Figure 5:
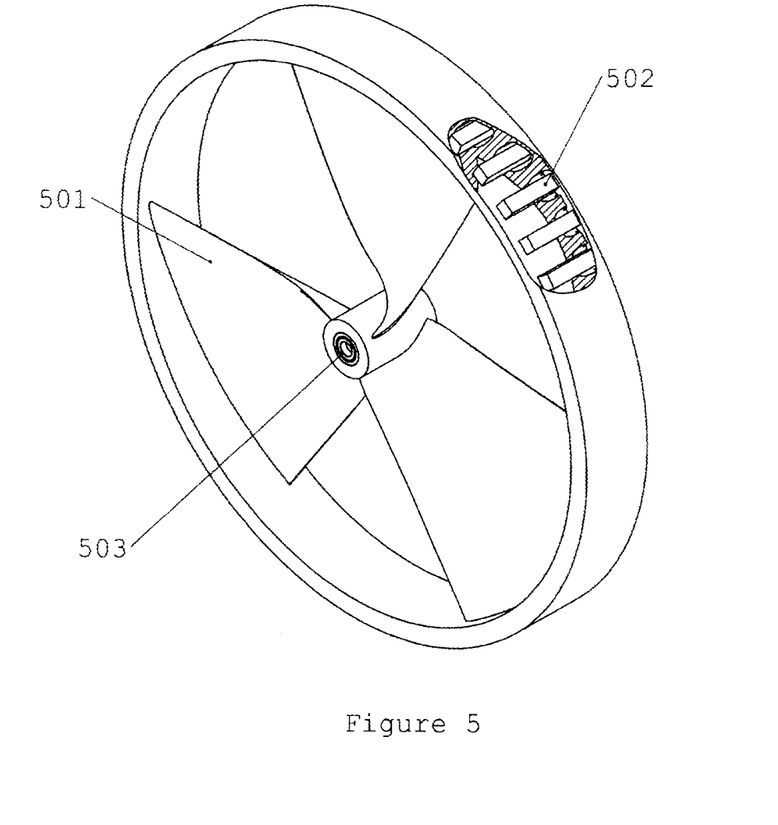
FIG. 5 is a perspective view of the blade and rotor assembly of an embodiment of the rim turbine generating unit of the present invention, with a cutaway portion showing the magnets therein.

Shown as the middle component in FIG. 4 is blade and rotor assembly 401, which is essentially the component of the rim turbine generating unit 205 that rotates from water currents to generate power. Assembly 401 rotatably mounts on the shaft 405 of venturi cowling and stator assembly 402 (the rightmost component shown in FIG. 4) preferably with the use of bearings 503 (see FIG. 5) to reduce friction between moving parts. In this respect, as the blade and rotor assembly 401 is mounted on shaft 405, the outer circumference of blade and rotor assembly 401 rotatably fits within the inner circumference of the venturi cowling and stator assembly 402. The blade and rotor assembly 401 is further shown by itself in FIG. 5, and comprises a number of turbine blades 501 (shown with three blades but the number of blades can be adjusted from upwards of 2 as necessary) that are, for instance, NACA5420 flared blades having a pitch of around 3.7". As shown in FIG. 5, the entire outer circumference of blade and rotor assembly 401 comprises magnets 502 embedded there within. For instance, the entire outer circumference of blade and rotor assembly 401 could comprise 48 grade N52 neodymium magnets 502 arranged preferably in a Halbach array configuration embedded there within.

Figure 6:
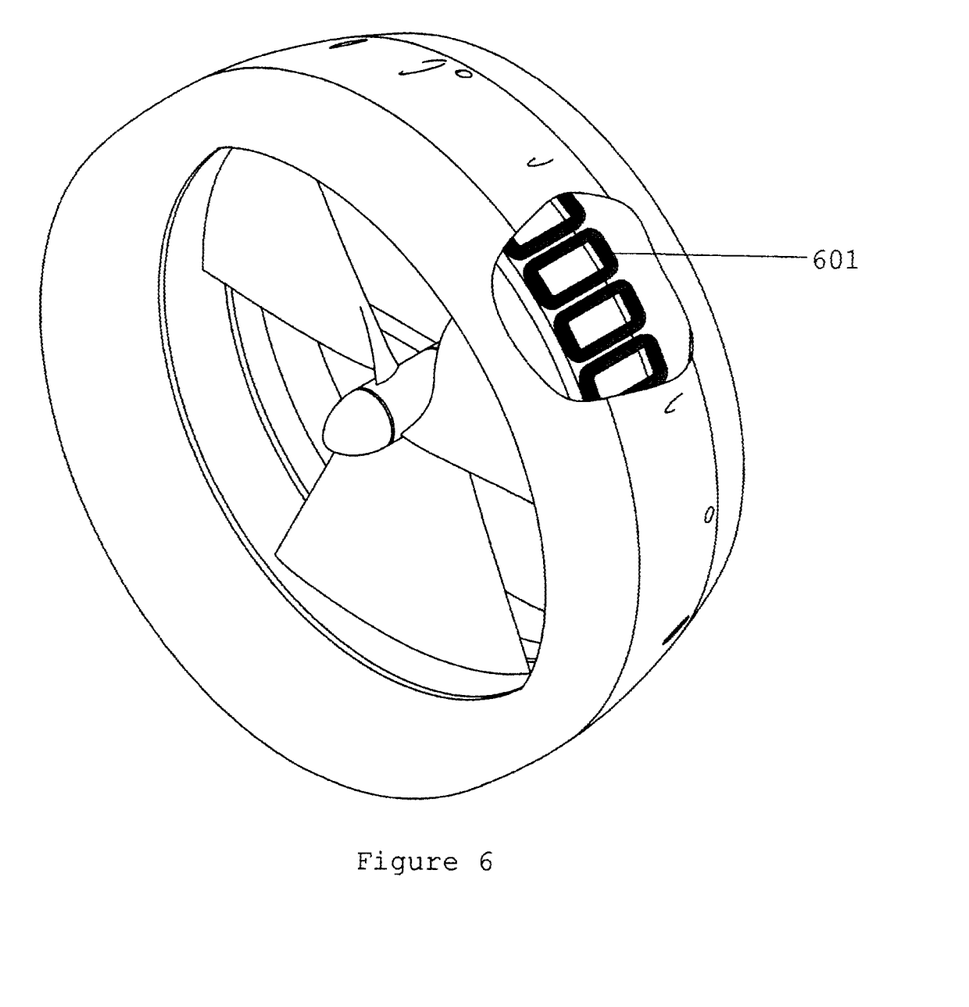
FIG. 6 is a perspective view of an embodiment of a rim turbine generating unit of the present invention, with a cutaway portion showing the coils of the venturi cowling and stator assembly.

The venturi cowling and stator assembly 402 is preferably fabricated without iron (i.e. no iron laminations as might be utilized in a typical motor/generator apparatus) in order to eliminate the effects of cogging (or "no-current") torque. As shown in FIG. 4, venturi cowling support rods 407 are mounted at peripheral ends thereof to the inner surface of the solid outer shell circumference (cowling) of venturi cowling and stator assembly 402, and attach at inner opposing ends thereof to a venturi cowling mount 408 that is located in the centre of venturi cowling and stator assembly 402. Support rods 407 can be of any number and shape as deemed necessary, so long as they do not significantly interfere with or obstruct the flow of water through assembly 402. While the venturi cowling support rods 407 provide structural support to the cowling and mount 408, the mount 408 prevents rotation of the venturi cowling and stator assembly 402 relative to the blade and rotor assembly 401 when assembly 401 is rotating and generating power. Tail cone 404 is releasably attached to mount 408 and is shaped to reduce turbulence as water passes through the rim turbine generating unit 205. The solid shell (outer circumference or cowling) of assembly 402 houses coils preferably of enamel coated magnet wire 601 configured for 3 phase output. For instance, the device could be fabricated with 36 coils 601 of wire embedded throughout the entire circumference there within, each preferably with 55 turns of 18 awg magnet wire (12 coils per phase). In this respect, FIG. 6 shows a perspective view of a fully assembled rim turbine generating unit 205 of the present invention, with a cutaway portion showing the coils 601 that are contained and embedded within the entire outer circumference (cowling) of the venturi cowling and stator assembly 402. When the blade and rotor assembly 401 is spinning as a result of water currents pushing against turbine blades 501, the flux from the spinning magnets 502 in the blade and rotor assembly 401 induces a current in the embedded coils 601 in the cowling of the venturi cowling and stator assembly 402. It is this current that is then managed by the battery and power management/tracking electronics 204 to power sensors in the mooring oceanographic equipment 100.

Leftmost in FIG. 4 is the venturi cowling cap 406, which preferably is capable of releasably coupling with venturi cowling and stator assembly 402 (the rightmost component in FIG. 4) when rim turbine generating unit 205 is fully assembled. Similarly, when fully assembled, nose cone 403 is releasably mounted on the free end of shaft 405. The venturi cowling cap 406 and nose cone 403 are preferably shaped so as to reduce turbulence and increase the water flow speed near the tips of turbine blades 501 (see FIG. 5) on blade and rotor assembly 401 and improve overall turbine performance, as well as provide the drag required to orient the turbine downstream of the flow, but this element is not essential to the basic functioning of the rim turbine generating unit 205.

Although the present invention and its advantages have been described in detail, it should be understood that various changes, substitutions and alternations can be made herein without departing from the spirit and scope of the invention as defined by the appended claims. The invention achieves multiple objectives and because the invention can be used in different applications for different purposes, not every embodiment falling within the scope of the attached claims will achieve every objective.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods or steps, presenting existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. An oceanographic sensor mooring section for use with standard oceanographic moorings comprising:

mooring oceanographic equipment having at least one sensor for measuring one or more of physical, chemical, or biological processes in an undersea environment; and a subsurface power generation unit connected to said mooring oceanographic equipment, wherein the power generation unit is mounted within a rigid frame that surrounds the entire power generation unit to protect same without significantly blocking water flow, and wherein the subsurface power generation unit comprising:

a battery pack system comprising a battery operatively connected to the at least one sensor in the mooring oceanographic equipment for powering said at least one sensor, and associated power management and tracking electronics for measuring power going to the battery, adjusting voltage going to the battery, and recharging the battery, said battery pack system housed within a pressure housing; and a rim turbine generating unit without a gearbox that is configured to generate electricity from underwater water currents and transmit same to the battery pack system to which it is operatively connected, wherein said rim turbine generating unit comprises three essential components, namely a first component comprising a venturi cowling and stator assembly having at least three venturi cowling support rods each mounted at peripheral ends thereof to an inner circumferential surface of the venturi cowling and stator assembly and attached at inner opposing ends thereof to a venturi cowling mount located in the center of the venturi cowling and stator assembly, said venturi cowling mount having a shaft extending in the center of the stator assembly therefrom, and coils embedded within an entire outer circumference of the venturi cowling and stator assembly, a second component comprising a blade and rotor assembly that is rotatably mounted on the shaft of the venturi cowling and stator assembly such that an outer circumference of the blade and rotor assembly rotatably fits within the inner circumferential surface of the venturi cowling and stator assembly, wherein said blade and rotor assembly comprises at least two turbine blades, and wherein the entire outer circumference of the blade and rotor assembly comprises magnets arranged in a Halbach array configuration embedded there within, such that when the blade and rotor assembly is spinning around the shaft of the venturi cowling and stator assembly as a result of water currents pushing against the turbine blades, a flux from the magnets in the blade and rotor assembly induces an electric current in the coils embedded in the venturi cowling and stator assembly that is transmitted to the battery pack system, and a third component comprising a venturi cowling cap that is capable of releasably coupling with the venturi cowling and stator assembly when the rim turbine generating unit is fully assembled, wherein the subsurface power generation unit is further associated with an alignment fin that assists in keeping said power generation unit aligned in the direction of current flow, and wherein said oceanographic sensor mooring section has connective swivels at opposing ends thereof for attachment of said mooring section to the standard oceanographic moorings, mooring lines, or mooring anchors, the connective swivels configured to allow said mooring section to orient in the direction of water current flow independently of an orientation of the standard oceanographic moorings, mooring lines, or mooring anchors.

2. The oceanographic sensor mooring section as claimed in claim 1 wherein said coils comprises at least 36 coils, each of said coils comprising 55 turns of 18 awg magnet wire and configured for 3 phase power output.

3. The oceanographic sensor mooring section as claimed in claim 1 wherein said rim turbine generating unit and said alignment fin pivot about a pivot point to allow the rim turbine generating unit and alignment fin to be self-compensating for mooring inclination.

\* \* \* \* \*